US012169389B2

(12) United States Patent
Yoshihara et al.

(10) Patent No.: US 12,169,389 B2
(45) Date of Patent: Dec. 17, 2024

(54) PHOTOLUMINESCENT TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Kotaro Yoshihara, Kanagawa (JP); Tsuyoshi Murakami, Kanagawa (JP); Asafumi Fujita, Kanagawa (JP); Teppei Yawada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 510 days.

(21) Appl. No.: 17/586,790

(22) Filed: Jan. 28, 2022

(65) Prior Publication Data

US 2023/0090120 A1 Mar. 23, 2023

(30) Foreign Application Priority Data

Sep. 21, 2021 (JP) ................................. 2021-153562

(51) Int. Cl.

*G03G 9/097* (2006.01)
*G03G 9/08* (2006.01)
*G03G 15/08* (2006.01)

(52) U.S. Cl.

CPC ....... *G03G 9/09716* (2013.01); *G03G 9/0819* (2013.01); *G03G 9/0821* (2013.01); *G03G 9/09725* (2013.01); *G03G 15/0865* (2013.01)

(58) Field of Classification Search

CPC ............. G03G 9/09716; G03G 9/0819; G03G 9/0821; G03G 9/09725; G03G 15/0865; G03G 9/0926

See application file for complete search history.

(56) References Cited

U.S. PATENT DOCUMENTS 9,529,288 B1 * 12/2016 Sugawara ................ G03G 9/08
9,841,693 B2 12/2017 Sugawara et al.

FOREIGN PATENT DOCUMENTS

JP 2015169899 9/2015
JP 2017142401 8/2017

* cited by examiner

*Primary Examiner* — Stewart A Fraser
(74) *Attorney, Agent, or Firm* — JCIPRNET

(57) ABSTRACT

A photoluminescent toner includes a photoluminescent toner particle that contains a binder resin, a release agent, and a photoluminescent pigment and has a release agent domain, and a silicone oil-treated silica particle that is externally added to the photoluminescent toner particle, in which in observation of a cross section of the photoluminescent toner particle, an average major axis length Dw of the release agent domain and an average major axis length Dp of the photoluminescent pigment satisfy Expression (1).

$0.3 \le Dw/Dp \le 1.0$ Expression (1):

13 Claims, 2 Drawing Sheets

PHOTOLUMINESCENT TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-153562 filed Sep. 21, 2021.

BACKGROUND

(i) Technical Field

The present disclosure relates to a photoluminescent toner, an electrostatic charge image developer, and a toner cartridge.

(ii) Related Art

JP2017-142401A discloses a photoluminescent toner that contains a photoluminescent toner particle containing a photoluminescent pigment and a release agent, in which the length of a release agent domain in a major axis direction is 300 nm or greater and 1500 nm or less, and the ratio between the length of the release agent domain in the major axis direction and the length of the release agent domain in a minor axis direction is 3.0 or greater and 15.0 or less.

JP2015-169899A discloses a toner that contains a binder resin, a colorant, and a release agent, in which the release agent has a flat domain, the long diameter of the domain of the release agent is 0.6 μm or greater, and the ratio between the long diameter and the short diameter of the domain of the release agent is 2.0 or greater in observation of a cross section of the toner before fixation, and the domain diameter of the release agent is 0.5 μm or less in observation of the cross section of the image after fixation.

SUMMARY

Aspects of non-limiting embodiments of the present disclosure relate to a photoluminescent toner, an electrostatic charge image developer, and a toner cartridge that are unlikely to generate gloss unevenness of a fixed image due to damage to the surface of a fixing member as compared with a photoluminescent toner in which an average major axis length Dw of a release agent domain and an average major axis length Dp of the photoluminescent pigment do not satisfy Expression (1) or a photoluminescent toner in which silicone oil-treated silica particles are not externally added. Here, Expression (1) is "$0.3 \le Dw/Dp \le 1.0$".

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above-described object includes the following aspects.

According to an aspect of the present disclosure, there is provided a photoluminescent toner including a photoluminescent toner particle that contains a binder resin, a release agent, and a photoluminescent pigment and has a release agent domain, and a silicone oil-treated silica particle that is externally added to the photoluminescent toner particle, in which in observation of a cross section of the photoluminescent toner particle, an average major axis length Dw of the release agent domain and an average major axis length Dp of the photoluminescent pigment satisfy Expression (1).

$$0.3 \le Dw/Dp \le 1.0 \quad \text{Expression (1):}$$

BRIEF DESCRIPTION OF THE DRAWINGS

Exemplary embodiment(s) of the present invention will be described in detail based on the following figures, wherein.

DETAILED DESCRIPTION

Figure 1:
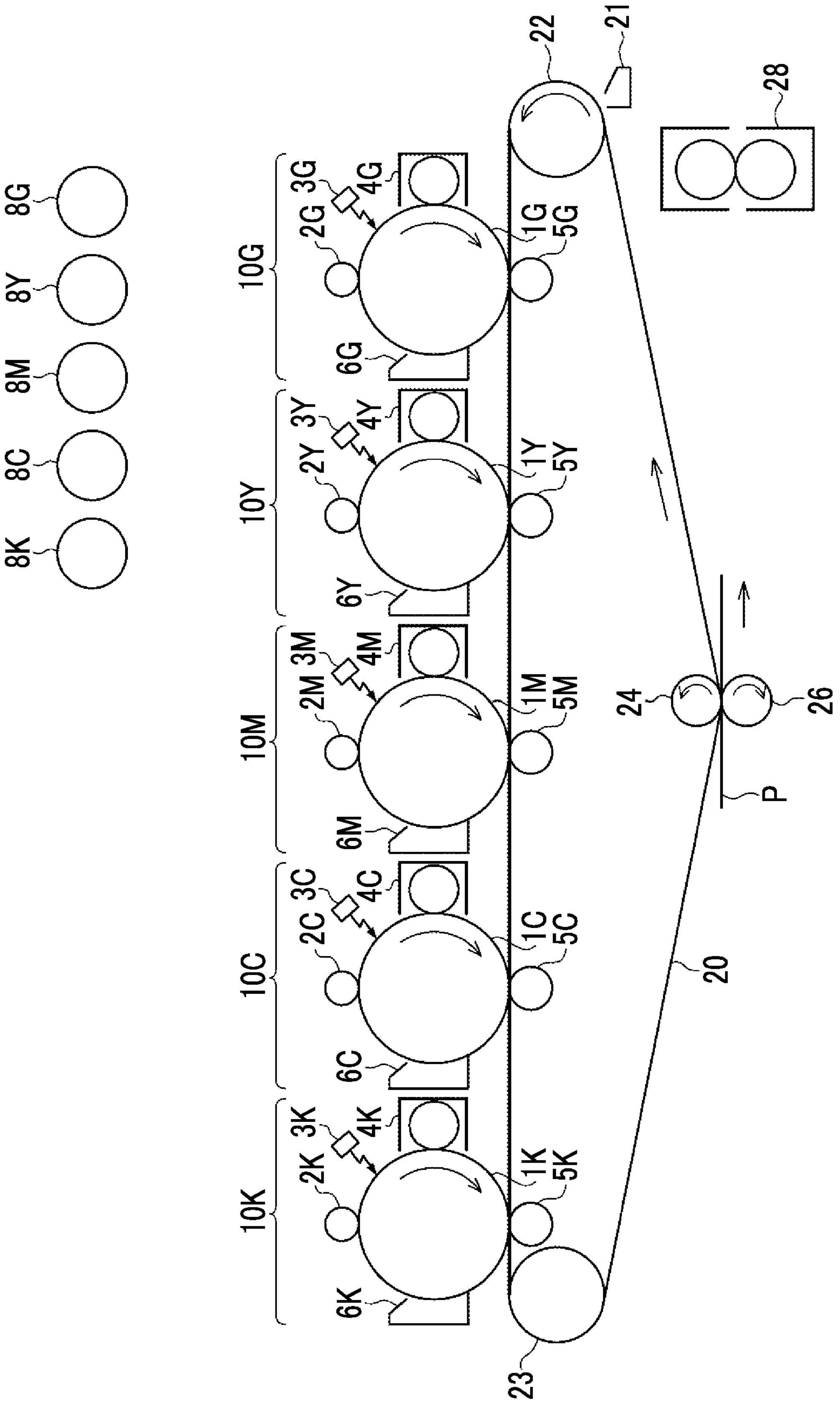
FIG. 1 is a schematic configuration view showing an example of an image forming device according to the present exemplary embodiment.

Hereinafter, exemplary embodiments of the present disclosure will be described. The following descriptions and examples merely illustrate the exemplary embodiments, and do not limit the scope of the exemplary embodiments.

In the present specification, a numerical range shown using "to" indicates a range including numerical values described before and after "to" as a minimum value and a maximum value.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present specification, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term "(meth)acrylic" indicates both acryl and methacryl, and the term "(meth)acrylate" indicates both acrylate and methacrylate.

In the present disclosure, the "electrostatic charge image developing toner" is also referred to as the "toner", the "electrostatic charge image developing carrier" is also referred to as the "carrier", and the "electrostatic charge image developer" is also referred to as the "developer".

Photoluminescent Toner

A photoluminescent toner according to the present exemplary embodiment contains a photoluminescent toner particle that contains a binder resin, a release agent, and a photoluminescent pigment and has a release agent domain, and a silicone oil-treated silica particle that is externally added to the photoluminescent toner particle.

In the photoluminescent toner according to the present exemplary embodiment, in observation of a cross section of the photoluminescent toner particle, an average major axis length Dw of the release agent domain and an average major axis length Dp of the photoluminescent pigment satisfy Expression (1).

$$0.3 \leq Dw/Dp \leq 1.0 \qquad \text{Expression (1):}$$

The photoluminescent toner according to the present exemplary embodiment is unlikely to generate gloss unevenness of a fixed image due to damage to the surface of a fixing member. The mechanism is assumed as follows.

The photoluminescent toner contains a photoluminescent pigment in the toner particles. The photoluminescent pigment is a hard pigment and may damage the surface of the fixing member. Due to the friction between a recording medium and a transport member, the recording medium is easily charged with static electricity, and thus a potential difference between the fixing member and the recording medium occurs. Due to the potential difference generated in the fixing member, the photoluminescent toner rises in the major axis direction of the photoluminescent pigment and is likely to damage the surface of the fixing member. In a case where images are continuously formed on coated paper at a relatively high speed in a low-temperature and low-humidity environment (for example, at a temperature of 10° C. and a relative humidity of 10%), static electricity is likely to be generated between the recording medium and the recording medium transfer member, and thus this phenomenon is significant. The fixing member having a damaged surface generates gloss unevenness in the fixed image.

The present inventors found that in regard to the above-described phenomenon, a photoluminescent toner obtained by combining photoluminescent toner particles satisfying Expression (1) and the silicone oil-treated silica particles serving as an external additive is unlikely to damage the surface of the fixing member. Even in a case where the photoluminescent toner rises in the major axis direction of the photoluminescent pigment on the recording medium, the photoluminescent toner slides and falls down during image fixation and is unlikely to damage the surface of the fixing member.

Expression (1) specifies that the ratio Dw/Dp of the average major axis length Dw of the release agent domain to the average major axis length Dp of the photoluminescent pigment is 0.3 or greater and 1.0 or less.

In a case where the ratio Dw/Dp is 1.0 or less, the release agent domain is crushed by the photoluminescent pigment during image fixation, and the release agent easily oozes outside the photoluminescent toner particles. In a case where the ratio Dw/Dp is greater than 1.0, the release agent domain is extremely larger than the photoluminescent pigment, and the release agent domain is not sufficiently crushed during image fixation.

On the contrary, in a case where the ratio Dw/Dp is less than 0.3, oozing of the release agent to the outside of the photoluminescent toner particles is disturbed by the photoluminescent pigment.

From the above-described viewpoint, for example, Expression (1-1) is preferable to Expression (1).

$$0.3 \leq Dw/Dp \leq 0.8 \qquad \text{Expression (1-1):}$$

Further, the release agent oozing outside the photoluminescent toner particles during image fixation comes into contact with the silicone oil-treated silica and is mixed with the silicone oil so that the viscosity is increased, and thus an appropriate amount of the release agent mixed with the silicone oil remains on the nip portion of the fixing member. The details of the mechanism are not clear, but the thickening of the release agent and the remaining on the nip portion cannot be expected with external additives other than the silicone oil-treated silica.

In the photoluminescent toner according to the present exemplary embodiment, from the viewpoint that the release agent domain is easily crushed during image fixation, for example, it is preferable that the shape of the release agent domain is close to a spherical shape. Therefore, in observation of a cross section of the photoluminescent toner particle, for example, the average aspect ratio of the release agent domain is preferably 1.00 or greater and 1.40 or less, more preferably 1.00 or greater and 1.25 or less, and still more preferably 1.00 or greater and 1.18 or less.

In the photoluminescent toner according to the present exemplary embodiment, from the viewpoint that the release agent easily oozes outside the photoluminescent toner particle during image fixation, for example, the area of the release agent domain contained in the surface layer portion to a depth of 1 μm from the surface of the photoluminescent toner particle, in observation of a cross section of the photoluminescent toner particle, is preferably 50% or greater and 100% or less, more preferably 60% or greater and 100% or less, and still more preferably 70% or greater and 100% or less with respect to the entire area of the release agent domain contained in the photoluminescent toner particle.

In the photoluminescent toner according to the present exemplary embodiment, from the viewpoint that the release agent easily oozes outside the photoluminescent toner particle during image fixation, for example, the average major axis length Dw of the release agent domain, in observation of a cross section of the photoluminescent toner particle, is preferably 0.3 μm or greater and 2.0 μm or less, more preferably 0.5 μm or greater and 1.5 μm or less, and still more preferably 0.5 μm or greater and 1.2 μm or less.

In the photoluminescent toner according to the present exemplary embodiment, from the viewpoint of achieving the balance between crushing of the release agent domain during image fixation and preventing damage to the fixing member, for example, the average major axis length Dp of the photoluminescent pigment, in observation of a cross section of the photoluminescent toner particle, is preferably 0.5 μm or greater and 10.0 μm or less, more preferably 0.5 μm or greater and 8.0 μm or less, and still more preferably 0.5 μm or greater and 6.5 μm or less.

Hereinafter, a method of observing a cross section of the photoluminescent toner particle and a method of measuring geometrical quantities will be described.

The photoluminescent toner particles (an external additive may be attached thereto) are embedded with a bisphenol A type liquid epoxy resin and a curing agent to prepare a cutting sample. A cutting sample is cut at a temperature of lower than −100° C. using a cutting device (for example, LEICA Ultra Microtome, manufactured by Hitachi High-Tech Corporation) equipped with a diamond knife to prepare an observation sample. The observation sample is allowed to stand in a desiccator under a ruthenium tetroxide atmosphere and dyed as necessary.

The observation sample is observed with a scanning transmission electron microscope (STEM), and a STEM image is recorded at a magnification that allows the cross section of one photoluminescent toner particle to be in the field of view. The recorded STEM image is analyzed under a condition of 0.010 μm/pixel using image analysis software (for example, WinROOF2015, Mitani Corporation).

The cross-sectional shape of the photoluminescent toner particles is determined based on a difference in brightness (contrast) between an epoxy resin for embedding and a binder resin of the photoluminescent toner particles.

Since the STEM image has cross sections of the photoluminescent toner particles with various sizes, cross sections of the photoluminescent toner particles in which the major axis length is 80% or greater of the volume average particle diameter of the photoluminescent toner particles are selected, and cross sections of 200 photoluminescent toner particles are randomly selected from the selected cross sections and observed.

The reason for selecting cross sections in which the major axis length is 80% or greater of the volume average particle diameter of the photoluminescent toner particles is that cross sections in which the major axis length is less than 80% of the volume average particle diameter is expected to be cross sections of the end portions of the photoluminescent toner particles, and thus the state of the domain in the photoluminescent toner particles is not sufficiently reflected on the cross section of the end portions of the photoluminescent toner particle.

In the present disclosure, the major axis length is the length of the longest straight line among all the straight lines connecting two points on the contour line.

The average major axis length Dw of the release agent domain is an arithmetic average value of the major axis lengths of the release agent domains in a case where all the release agent domains contained in 200 photoluminescent toner particles are set as measurement targets.

The average aspect ratio of the release agent domain is an arithmetic average value of the aspect ratios of the release agent domains in a case where all the release agent domains contained in 200 photoluminescent toner particles are set as measurement targets. The aspect ratio of the release agent domain is the ratio of the major axis length to the minor axis length (major axis length/minor axis length). The minor axis length is the length of the longest straight line among the straight lines orthogonal to the major axis and connecting the opposing contour lines.

The average major axis length Dp of the photoluminescent pigment is an arithmetic average value of the major axis lengths of the photoluminescent pigments in a case where all the photoluminescent pigments contained in 200 photoluminescent toner particles are set as measurement targets.

The area of the release agent domain is the total area of the release agent domains in a case where all the release agent domains contained in 200 photoluminescent toner particles are set as measurement targets.

The surface layer portion to a depth of 1 μm from the surface of the photoluminescent toner particle is a region to a depth of 1 μm on a straight line toward the center of gravity of the photoluminescent toner particle from the surface of the photoluminescent toner particle. The center of gravity of the photoluminescent toner particle satisfies the relationships of "x coordinate of center of gravity=(total of $x_i$)/n" and "y coordinate of center of gravity=(total of $y_i$)/n" in a case where the number of pixels in the photoluminescent toner particle is defined as n and the xy coordinates of each pixel are set as $x_i$ and $y_i$ (i=1, 2, . . . , n).

In the photoluminescent toner according to the present exemplary embodiment, from the viewpoint that the release agent oozed outside the photoluminescent toner particle during image fixation is thickened and an appropriate amount of the release agent remains on the nip portion of the fixing member, for example, the mass ratio (free oil/release agent) of the amount of free oil present in the photoluminescent toner to the amount of the release agent contained in the photoluminescent toner particle is preferably 0.03 or greater and 2.00 or less, more preferably 0.05 or greater and 2.00 or less, still more preferably 0.08 or greater and 1.80 or less, and even still more preferably 0.10 or greater and 1.50 or less.

A method of measuring the amount of free oil present in the photoluminescent toner will be described.

The photoluminescent toner to which an external additive has been externally added is dispersed in hexane so that the toner concentration reaches 5% by mass, ultrasonic waves (output of 20 W and frequency of 20 kHz) are applied thereto for 20 minutes, and the solid content is precipitated by centrifugation. In a case where the mass of the photoluminescent toner as a sample is defined as Wb and the solid content after centrifugation is defined as Wa, the mass ratio (%) of the free oil contained in the photoluminescent toner is expressed by the following equation.

$$\text{Mass ratio of free oil (\%)}=(Wb-Wa)/Wb\times 100$$

The mass of free oil present in a unit amount of the photoluminescent toner is calculated from the mass ratio (%) of free oil.

In the photoluminescent toner according to the present exemplary embodiment, for example, it is preferable that at least one endothermic peak is observed in a temperature range of 80° C. or higher and 100° C. or lower during the differential scanning calorimetry. This thermal characteristic can be realized by allowing the photoluminescent toner particle to contain a release agent having a melting temperature of 80° C. or higher and 100° C. or lower. In the photoluminescent toner having this thermal characteristic, the release agent is likely to ooze outside the photoluminescent toner particle during image fixation.

The differential scanning calorimetry (DSC) measurement is carried out by adding 5.0 mg±0.3 mg of the photoluminescent toner to an aluminum sample pan and increasing the temperature from room temperature to 150° C. at a rate of 5° C./min in a nitrogen atmosphere, using a differential scanning calorimetry device.

Hereinafter, the toner according to the present exemplary embodiment will be described in detail.

Photoluminescent Toner Particles

The photoluminescent toner particles contains a binder resin, a release agent, and a photoluminescent pigment and has other additives as necessary.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

The binder resins may be used alone or in combination of two or more kinds thereof.

As the binder resin, for example, a polyester resin is preferable.

Examples of the polyester resin include known amorphous polyester resins. As the polyester resin, a combination of an amorphous polyester resin and a crystalline polyester resin may be used. The content of the crystalline polyester resin is, for example, in a range of 2% by mass or greater and 40% by mass or less (preferably 2% by mass or greater and 20% by mass or less) with respect to all the binder resins.

The "crystallinity" of a resin indicates that a clear endothermic peak is present in differential scanning calorimetry (DSC) rather than a stepwise change in endothermic amount and specifically indicates that the half-width of the endothermic peak during measurement at a temperature rising rate of 10° C./min is within 10° C.

The "amorphous" resin indicates that the half-width is higher than 10° C., a stepwise change in endothermic amount is shown, or a clear endothermic peak is not recognized.

Amorphous Polyester Resin

Examples of the amorphous polyester resin include a condensed polymer of a polyvalent carboxylic acid and a polyhydric alcohol. As the amorphous polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among the examples, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A) and an aromatic diol (such as an ethylene oxide adduct of bisphenol A or a propylene oxide adduct of bisphenol A). Among the examples, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The glass transition temperature (Tg) of the amorphous polyester resin is, for example, preferably 50° C. or higher and 80° C. or lower and more preferably 50° C. or higher and 65° C. or lower. Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average molecular weight (Mw) of the amorphous polyester resin is, for example, preferably 5000 or greater and 1000000 or less and more preferably 7000 or greater and 500000 or less.

The number average molecular weight (Mn) of the amorphous polyester resin is, for example, preferably 2000 or greater and 100000 or less.

The molecular weight distribution Mw/Mn of the amorphous polyester resin is, for example, preferably 1.5 or greater and 100 or less and more preferably 2 or greater and 60 or less. Further, the weight-average molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average molecular weight and the number average molecular weight are calculated using a molecular weight calibration curve created by a monodisperse polystyrene standard sample based on the measurement results.

Crystalline Polyester Resin

Examples of the crystalline polyester resin include a polycondensate of a polyvalent carboxylic acid and a polyhydric alcohol. As the crystalline polyester resin, a commercially available product or a synthesized product may be used. Since the crystalline polyester resin easily forms a crystal structure, for example, a polycondensate obtained by using a linear aliphatic polymerizable monomer is preferable to a polymerizable monomer having an aromatic ring.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of such dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the examples, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

Here, as the polyhydric alcohol, for example, the content of the aliphatic diol may be set to 80% by mole or greater and preferably 90% by mole or greater.

The melting temperature of the crystalline polyester resin is, for example, preferably 50° C. or higher and 100° C. or lower, more preferably 55° C. or higher and 90° C. or lower, and still more preferably 60° C. or higher and 85° C. or lower. Further, the melting temperature is acquired from the DSC curve obtained by differential scanning calorimetry (DSC) according to the "melting peak temperature" described in the method of acquiring the melting temperature in JIS K7121-1987 "Method of measuring transition temperature of plastics".

The weight-average molecular weight (Mw) of the crystalline polyester resin is, for example, preferably 6,000 or greater and 35,000 or less.

The content of the binder resin is, for example, preferably 40% by mass or greater and 70% by mass or less, more preferably 50% by mass or greater and 65% by mass or less, and still more preferably 50% by mass or greater and 60% by mass or less with respect to the entirety of the photoluminescent toner particles.

Release Agent

Examples of the release agent include hydrocarbon-based wax; natural wax such as carnauba wax, rice wax, or candelilla wax; synthetic or mineral/petroleum wax such as montan wax; and ester wax such as fatty acid ester or montanic acid ester. The release agent is not limited thereto.

As the release agent, from the viewpoint of ease of uneven distribution in the surface layer portion of the photoluminescent toner particles, for example, ester wax is preferable, and fatty acid ester wax is more preferable.

The melting temperature of the release agent is, for example, preferably 50° C. or higher and 110° C. or lower, more preferably 60° C. or higher and 100° C. or lower, and still more preferably 80° C. or higher and 100° C. or lower. The melting temperature of the release agent is acquired from the DSC curve obtained by differential scanning calorimetry (DSC) in conformity with the "method of measuring transition temperature of plastics" and "melting peak temperature" in JIS K 7121:1987.

The content of the release agent is, for example, preferably 1% by mass or greater and 20% by mass or less, more preferably 5% by mass or greater and 15% by mass or less, and still more preferably 5% by mass or greater and 10% by mass or less with respect to the entirety of the photoluminescent toner particles.

Photoluminescent Pigment

The photoluminescent pigment is a pigment that exhibits photoluminescent properties. From the viewpoint of increasing the intensity of specular reflection, for example, it is preferable that the photoluminescent pigment has a flat shape.

Examples of the photoluminescent pigment include powder of a metal such as aluminum, brass, bronze, nickel, stainless steel, or zinc, mica coated with titanium oxide or yellow iron oxide, a flaky crystal or a plate crystal such as an aluminosilicate, a basic carbonate, barium sulfate, titanium oxide, or bismuth oxychloride, flaky glass powder, metal-deposited flaky glass powder, and a guanine crystal.

As the photoluminescent pigment, for example, metal powder is preferable from the viewpoint of the intensity of specular reflection, and aluminum is preferable from the viewpoint of easily obtaining flat powder. That is, as the photoluminescent pigment, for example, flat aluminum powder is preferable. The surface of the metal powder may be coated with an acrylic resin, a polyester resin, or the like.

The ratio of the average major axis length to the average thickness of the photoluminescent pigment is, for example, preferably 5 or greater and 200 or less, more preferably 10 or greater and 100 or less, and still more preferably 30 or greater and 70 or less.

The content of the photoluminescent pigment is, for example, preferably 1% by mass or greater and 50% by mass or less, more preferably 10% by mass or greater and 30% by mass or less, and still more preferably 15% by mass or greater and 25% by mass or less with respect to the entirety of the photoluminescent toner particles.

Colorant

The photoluminescent toner particles may contain a colorant. Examples of other colorants include pigments such as Carbon Black, Chrome Yellow, Hansa Yellow, Benzidine Yellow, Suren Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, Dupont Oil Red, Pyrazolone Red, Lithol Red, Rhodamin B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

The colorants may be used alone or in combination of two or more kinds thereof.

As the colorant, a surface-treated colorant may be used as necessary, or a combination with a dispersant may be used. Further, a plurality of kinds of colorants may be used in combination.

The content of the colorant is, for example, preferably 1% by mass or greater and 30% by mass or less and more preferably 3% by mass or greater and 15% by mass or less with respect to the entirety of the photoluminescent toner particles.

Other Additives

Examples of other additives include known additives such as a magnetic material, a charge control agent, and inorganic powder. Such additives are contained in the photoluminescent toner particles as internal additives.

Characteristics of Photoluminescent Toner Particles and the Like

The photoluminescent toner particles may be photoluminescent toner particles having a single layer structure or photoluminescent toner particles having a so-called core-shell structure formed of a core portion (core particle) and a coating layer (shell layer) covering the core portion. The photoluminescent toner particles having a core-shell structure may be formed of, for example, a core portion containing a binder resin, a release agent, and a photoluminescent pigment, and a coating layer containing a binder resin.

The volume average particle diameter of the photoluminescent toner particles is, for example, preferably 1 μm or greater and 22 μm or less and more preferably 3 μm or greater and 20 μm or less.

The volume average particle diameter of the photoluminescent toner particles is measured using Coulter Multisizer II (manufactured by Beckman Coulter Inc.) and ISOTON-II (manufactured by Beckman Coulter Inc.) as an electrolytic solution. During the measurement, 0.5 mg or greater and 50 mg or less of a measurement sample is added to 2 ml of a 5 mass % aqueous solution of a surfactant (for example, preferably sodium alkylbenzene sulfonate) as a dispersant. The solution is added to 100 ml or greater and 150 ml or less of the electrolytic solution. The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. The number of particles to be sampled is 50000.

From the viewpoint of obtaining satisfactory photoluminescent properties and a satisfactory image quality, the average major axis length of the photoluminescent toner particles is, for example, preferably 0.5 μm or greater and 30 μm or less, more preferably 1 μm or greater and 30 μm or less, still more preferably 3 μm or greater and 20 μm or less, and even still more preferably 5 μm or greater and 15 μm or less.

The average major axis length of the photoluminescent toner particles in a case where the average length of the photoluminescent toner particles in the thickness direction is set to 1 is, for example, preferably 5 or greater and 200 or less, more preferably 10 or greater and 100 or less, and still more preferably 30 or greater and 70 or less.

The major axis length and the thickness of the photoluminescent toner particles are acquired by image analysis performed on 200 photoluminescent toner particles in the above-described STEM image. The major axis length is the length of the longest straight line among all the straight lines connecting two points on the contour line. The thickness is the length of the longest straight line among the straight lines orthogonal to the major axis and connecting the opposing contour lines.

External Additive

The photoluminescent toner according to the present exemplary embodiment is a toner in which at least silicone oil-treated silica particles are externally added to the photoluminescent toner particles. The photoluminescent toner according to the present exemplary embodiment may be formed such that an external additive other than the silicone oil-treated silica particles is externally added.

As the silicone oil of the silicone oil-treated silica particles, for example, dimethyl silicone oil is preferable.

The silicone oil treatment of the silica particles is performed by, for example, a method of dispersing particles in silicone oil dissolved in alcohol, distilling off the alcohol using an evaporator, and drying the particles.

From the viewpoint of supplying an appropriate amount of silicone oil to the surface of the photoluminescent toner particles, the average primary particle diameter of the silicone oil-treated silica particles is, for example, preferably 40 nm or greater and 140 nm or less, more preferably 40 nm or greater and 120 nm or less, and still more preferably 40 nm or greater and 100 nm or less.

The primary particle diameter of the silicone oil-treated silica particles is the diameter of a circle having the same area as the primary particle image (so-called equivalent circle diameter), and the average primary particle diameter is the particle diameter that is 50% cumulative from the small diameter side in the distribution based on the number of primary particle diameters.

A method for measuring the primary particle diameter of the silicone oil-treated silica particles will be described.

An image of the photoluminescent toner to which an external additive is externally added is captured at a magnification of 40000 times using a scanning electron microscope (SEM) (S-4800, Hitachi High-Tech Corporation) equipped with an energy dispersive X-ray analyzer (EDX device) (EMAX Evolution X-Max80 $mm^2$, manufactured by HORIBA, Ltd.). By performing EDX analysis, 500 primary particles of silicone oil-treated silica particles are identified from one field of view based on the presence of silicon atoms and carbon atoms. The identified silicone oil-treated silica particles are analyzed by the image processing analysis software WinRoof (Mitani Corporation), and the equivalent circle diameter of each primary particle image is acquired.

The photoluminescent toner may contain external additives other than the silicone oil-treated silica particles. Examples of other external additive include $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$. The surface of the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent.

Examples of other external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The content of the silicone oil-treated silica particles contained in the photoluminescent toner is, for example, preferably 60% by mass or greater and 100% by mass or less, more preferably 70% by mass or greater and 100% by mass or less, and still more preferably 80% by mass or greater and 100% by mass or less with respect to the total amount of the external additive contained in the photoluminescent toner.

The amount of the external additive to be externally added is, for example, preferably 0.01% by mass or greater and 5% by mass or less and more preferably 0.01% by mass or greater and 2.5% by mass or less with respect to the entirety of the photoluminescent toner particles.

Method of Producing Photoluminescent Toner

The photoluminescent toner according to the present exemplary embodiment is obtained by externally adding silicone oil-treated silica particles to the photoluminescent toner particles after production of the photoluminescent toner particles.

The photoluminescent toner particles may be produced by any of a dry production method (for example, a kneading and pulverizing method) or a wet production method (for example, an aggregation and coalescence method, a suspension polymerization method, or a dissolution suspension method). The production method is not particularly limited, and a known production method is employed. Among the examples, the photoluminescent toner particles may be obtained by, for example, the aggregation and coalescence method.

In a case where the photoluminescent toner particles are produced by the aggregation and coalescence method, for example, the photoluminescent toner particles are produced by performing a step of preparing a resin particle dispersion liquid in which resin particles serving as a binder resin are dispersed (resin particle dispersion liquid preparation step), a step of preparing a release agent particle dispersion liquid in which release agent particles are dispersed (release agent particle dispersion liquid preparation step), a step of preparing a photoluminescent pigment dispersion liquid in which a photoluminescent pigment is dispersed (photoluminescent pigment dispersion liquid preparation step), a step of allowing mixed particles to be aggregated in a mixed dispersion liquid of the resin particle dispersion liquid, the release agent particle dispersion liquid, and the photoluminescent pigment dispersion liquid to form aggregated particles (aggregated particle formation step), and a step of heating an aggregated particle dispersion liquid in which the aggregated particles are dispersed and fusing and coalescing the aggregated particles to form photoluminescent toner particles (fusion and coalescence step).

Resin Particle Dispersion Liquid Preparation Step

The resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Depending on the kind of resin particles, the resin particles may be dispersed in a dispersion medium by a phase inversion emulsification method. The phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing phase inversion from W/O to O/W, and dispersing the resin in the aqueous medium in the particle form.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less. The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

Release Agent Particle Dispersion Liquid Preparation Step

For example, the release agent, the aqueous medium, and the surfactant are mixed and subjected to a dispersion treatment with a disperser (for example, a pressure discharge type homogenizer or a rotary shear homogenizer) while being heated. The aqueous medium and the surfactant are respectively the same as the aqueous medium and the surfactant described above in the section of the resin particle dispersion liquid.

The release agent particles may be aggregated by adding an aggregating agent after the dispersion treatment. Examples of the aggregating agent include a surfactant having a polarity opposite to the polarity of the surfactant used for dispersion, an inorganic metal salt, and a divalent or higher valent metal complex.

The volume average particle diameter of the particles dispersed in the release agent particle dispersion liquid is, for example, preferably 0.1 μm or greater and 1.0 μm or less.

The content of the particles contained in the release agent particle dispersion liquid is, for example, preferably 5% by mass or greater and 50% by mass or less and more preferably 10% by mass or greater and 40% by mass or less.

Photoluminescent Pigment Dispersion Liquid Preparation Step

For example, the photoluminescent pigment, the aqueous medium, and the surfactant are mixed and subjected to a dispersion treatment with a disperser (for example, a rotary shear homogenizer). The aqueous medium and the surfactant are respectively the same as the aqueous medium and the surfactant described above in the section of the resin particle dispersion liquid.

The content of the photoluminescent pigment contained in the photoluminescent pigment dispersion liquid is, for example, preferably 5% by mass or greater and 50% by mass or less and more preferably 10% by mass or greater and 40% by mass or less.

Aggregated Particle Formation Step

Next, the resin particle dispersion liquid, the release agent particle dispersion liquid, and the photoluminescent pigment dispersion liquid are mixed. Further, the resin particles, the release agent particles, and the photoluminescent pigment are heteroaggregated in the mixed dispersion liquid to form aggregated particles (also referred to as core particles) containing the resin particles, the release agent particles, and the photoluminescent pigment.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to a temperature close to the glass transition temperature of the resin particles (specifically, for example, a temperature higher than or equal to the glass transition temperature of the resin particles—30° C. and lower than or equal to the glass transition temperature thereof—10° C.) and allowing the particles to be dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant contained in the mixed dispersion liquid, an inorganic metal salt, and a divalent or higher valent metal complex. In a case where a metal complex is used as the aggregating agent, the amount of the surfactant to be used is reduced, and the charging characteristics are improved.

In addition to the aggregating agent, an additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent to be added is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

Next, the pH of the aggregated particle dispersion liquid in which the aggregated particles are dispersed is adjusted to be alkaline and heated to a temperature higher than or equal to the glass transition temperature of the resin particles (for example, a temperature higher than the glass transition temperature of the resin particles by 10° C. to 30° C.) and the aggregated particles are fused and coalesced, thereby forming photoluminescent toner particles. By adjusting the pH of the aggregated particle dispersion liquid to be alkaline (for example, a pH of 7 or greater and 9 or less) before being heated, the binder resin is swollen, and thus the growth of the release agent domain is promoted.

After heating, the reaching temperature is maintained, for example, 1 hour to 6 hours, the pH is lowered from neutral to weakly acidic, and the dispersion liquid in which the fused and coalesced particles are dispersed is cooled.

The photoluminescent toner particles are obtained by performing the above-described steps.

Further, the photoluminescent toner particles may be produced by performing a step of obtaining the aggregated particle dispersion liquid in which the aggregated particles are dispersed, further mixing the aggregated particle dispersion liquid, the resin particle dispersion liquid, and the release agent particle dispersion liquid, and allowing the resin particles and the release agent particles to be aggregated such that the resin particles and the release agent particles are further attached to the surface of each aggregated particle to form second aggregated particles and a step of heating the second aggregated particle dispersion liquid in which the second aggregated particles are dispersed and fusing and coalescing the second aggregated particle to form photoluminescent toner particles having a core-shell structure.

After completion of the fusion and coalescence step, photoluminescent toner particles in a dry state are obtained by performing a known cleaning step, a known solid-liquid separation step, and a known drying step on the photoluminescent toner particles in the dispersion liquid. From the viewpoint of the charging properties, for example, displacement cleaning may be sufficiently performed as the cleaning step using ion exchange water. From the viewpoint of the productivity, for example, suction filtration, pressure filtration, or the like may be performed as the solid-liquid separation step. From the viewpoint of the productivity, for example, freeze-drying, flush drying, fluidized drying, vibratory fluidized drying, or the like may be performed as the drying step.

The toner according to the present exemplary embodiment is produced by, for example, adding silicone oil-treated silica particles to the obtained photoluminescent toner particles in a dry state and mixing the particles. The mixing may be performed, for example, using a V blender, a Henschel mixer, a Lödige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the photoluminescent toner according to the present exemplary embodiment. The electrostatic charge image developer according to the present exemplary embodiment may be a one-component developer which contains only the photoluminescent toner according to the present exemplary embodiment or a two-component developer obtained by mixing the photoluminescent toner and a carrier.

The carrier is not particularly limited, and examples thereof include known carriers. Examples of the carrier include a coated carrier obtained by coating the surface of a core material consisting of magnetic powder with a resin, a magnetic powder dispersion type carrier obtained by dispersing magnetic powder in a matrix resin so as to be blended, and a resin impregnation type carrier obtained by impregnating porous magnetic powder with a resin. Each of the magnetic powder dispersion type carrier and the resin impregnation type carrier may be a carrier obtained by coating the surface of a core material, which is particles configuring the carrier, with a resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

Examples of a method of coating the surface of the core material with a resin include a method of coating the surface with a solution for forming a coating layer obtained by dissolving the coating resin and various additives (used as necessary) in an appropriate solvent. The solvent is not particularly limited, and may be selected in consideration of the kind of the resin to be used, coating suitability, and the like. Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

In a case where the image forming device according to the present exemplary embodiment is the intermediate transfer type device, for example, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachably attached to the image forming device. For example, a process cartridge including a developing unit that accommodates the electrostatic charge image developer according to the present exemplary embodiment is preferably used as the process cartridge.

The image forming device according to the present exemplary embodiment may be a tandem type image forming device in which at least one of an image forming unit that forms a photoluminescent toner image or an image forming unit that forms a non-photoluminescent toner image is arranged in parallel or may be an image forming device having only an image forming unit that forms a photoluminescent toner image.

Hereinafter, an example of the image forming device according to the present exemplary embodiment will be described, but the present exemplary embodiment is not limited thereto. In the description below, main parts shown in the figures will be described, but description of other parts will not be provided.

FIG. 1 is a schematic configuration view showing an image forming device according to the present exemplary embodiment and is a view showing an image forming device having a 5-series tandem system and an intermediate transfer system.

The image forming device shown in FIG. 1 includes first to fifth image forming units 10G, 10Y, 10M, 10C, and 10K having an electrophotographic system of outputting images of each color of photoluminescent (G), yellow (Y), magenta (M), cyan (C), and black (K) based on color-separated image data. The image forming units (hereinafter, also simply referred to as "units") 10G, 10Y, 10M, 10C, and 10K are arranged in parallel at predetermined intervals in the horizontal direction. The units 10G, 10Y, 10M, 10C, and 10K may be process cartridges detachable from the image forming device.

Below the units 10G, 10Y, 10M, 10C, and 10K, an intermediate transfer belt 20 (an example of the intermediate transfer member) extends across each of the units. An intermediate transfer belt 20 is provided by winding around a drive roll 22, a support roll 23, and an opposing roll 24 that are in contact with the inner surface of the intermediate transfer belt 20 and is designed to travel in a direction from the first unit 10G to the fifth unit 10K. An intermediate transfer member cleaning device 21 facing the drive roll 22 is provided on the image holding surface side of the intermediate transfer belt 20.

Each of photoluminescent toner, yellow toner, magenta toner, cyan toner, and black toner stored in toner cartridges 8G, 8Y, 8M, 8C, and 8K is supplied to each of developing devices (an example of developing units) 4G, 4Y, 4M, 4C, and 4K of the units 10G, 10Y, 10M, 10C, and 10K.

Since the first to fifth units 10G, 10Y, 10M, 10C, and 10K have the identical configurations and operations, the first unit 10G that forms a photoluminescent image disposed on the upstream side in the traveling direction of the intermediate transfer belt will be described as a representative example.

The first unit 10G includes a photoreceptor 1G that functions as an image holding member. A charging roll (an example of the charging unit) 2G that charges the surface of the photoreceptor 1G at a predetermined potential, an exposure device (an example of the electrostatic charge image forming unit) 3G that exposes the charged surface to a laser beam based on a color-separated image signal to form an electrostatic charge image, a developing device (an example of a developing unit) 4G that supplies the toner to the electrostatic charge image to develop the electrostatic charge image, a primary transfer roll (an example of the primary transfer unit) 5G that transfers the developed toner image onto the intermediate transfer belt 20, and a photoreceptor cleaning device (an example of the cleaning unit) 6G that removes the toner remaining on the surface of the photoreceptor 1G after the primary transfer are arranged in this order in the periphery of the photoreceptor 1G.

The primary transfer roll 5G is disposed inside the intermediate transfer belt 20 and provided at a position facing the photoreceptor 1G. Each bias power supply (not shown) that applies a primary transfer bias is connected to each of the primary transfer rolls 5G, 5Y, 5M, 5C, and 5K of the units. Each bias power supply changes the value of the transfer bias applied to each primary transfer roll by the control of a control unit (not shown).

Hereinafter, an operation of forming a photoluminescent image in the first unit 10G will be described.

First, prior to the operation, the surface of the photoreceptor 1G is charged at a potential of −600 V to −800 V by the charging roll 2G.

The photoreceptor 1G is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam, the specific resistance of the portion irradiated with the laser beam changes. Therefore, the exposure device 3G irradiates the surface of the charged photoreceptor 1G with the laser beam based on photoluminescent image data sent from a control unit (not shown). In this manner, an electrostatic charge image in a photoluminescent image pattern is formed on the surface of the photoreceptor 1G.

The electrostatic charge image is an image formed on the surface of the photoreceptor 1G by performing charging, which is a so-called negative latent image formed in a case where the specific resistance of the portion in the photosensitive layer irradiated with the laser beam is decreased by the laser beam from the exposure device 3G, the charged electric charge on the surface of the photoreceptor 1G flows, and the electric charge in a portion that has not been irradiated with the laser beam remains.

The electrostatic charge image formed on the photoreceptor 1G rotates to a predetermined development position according to the traveling of the photoreceptor 1G. Further, the electrostatic charge image on the photoreceptor 1G is developed and visualized at this development position as a toner image by the developing device 4G.

For example, an electrostatic charge image developer containing at least a photoluminescent toner and a carrier is accommodated in the developing device 4G. The photoluminescent toner is stirred to be frictionally charged inside the developing device 4G, has an electric charge having the same polarity (negative polarity) as the charged electric charge on the photoreceptor 1G, and is held on a developer roll (an example of the developer holding member). Further, as the surface of the photoreceptor 1G passes through the developing device 4G, the photoluminescent toner is electrostatically attached to the electricity-removed latent image portion on the surface of the photoreceptor 1G, and the latent image is developed by the photoluminescent toner. The photoreceptor 1G on which the photoluminescent toner image is formed is continuously traveled at a predetermined speed, and the toner image developed on the photoreceptor 1G is transported to a predetermined primary transfer position.

In a case where the photoluminescent toner image on the photoreceptor 1G is transported to the primary transfer position, a primary transfer bias is applied to the primary transfer roll 5G, and an electrostatic force from the photoreceptor 1G toward the primary transfer roll 5G acts on the toner image, and the toner image on the photoreceptor 1G is transferred onto the intermediate transfer belt 20. The transfer bias applied at this time has a polarity (+) opposite to the polarity (−) of the toner and is controlled to, for example, +10 μA by a control unit (not shown) in the first unit 10G.

After transferring the toner image to the intermediate transfer belt 20, the photoreceptor 1G continues to rotate and comes into contact with the cleaning blade included in the photoreceptor cleaning device 6G. Further, the toner remaining on the photoreceptor 1G is removed by the photoreceptor cleaning device 6G and recovered.

The primary transfer bias applied to the primary transfer rolls 5Y, 5M, 5C, and 5K of the second to fifth units 10Y, 10M, 10C, and 10K is also controlled according to the first unit.

In this manner, the intermediate transfer belt 20 to which the photoluminescent toner image is transferred by the first unit 10G is sequentially transported through the second to fifth units 10Y, 10M, 10C, and 10K, and the toner images of each color are superimposed and multiple-transferred.

The intermediate transfer belt 20, to which the toner images of five colors are multiple-transferred through the first to fifth units, reaches a secondary transfer unit formed of the intermediate transfer belt 20, an opposing roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the opposing roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

After transferring the toner image to the recording paper P, the intermediate transfer belt 20 continues to travel and comes into contact with the cleaning blade included in the intermediate transfer member cleaning device 21. The toner remaining on the intermediate transfer belt 20 is removed by the intermediate transfer member cleaning device 21 and recovered.

The recording paper P to which the toner image is transferred is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

The aspect of image formation by the image forming device shown in FIG. 1 is not limited to the description above. Examples of the aspect of image formation include an aspect in which a photoluminescent image is formed on one surface of the recording paper P by operating only the first unit 10G, the recording paper P is sent upstream in the traveling direction of the intermediate transfer belt, and a color image is formed on the photoluminescent image of the recording paper P by operating the second unit 10Y to the fifth unit 10K, an aspect in which a photoluminescent image is formed on one surface of the recording paper P by operating only the first unit 10G, the recording paper P is sent upstream in the traveling direction of the intermediate transfer belt, and a color image and a photoluminescent image are formed on the photoluminescent image of the recording paper P by operating the first unit 10G to the fifth unit 10K, and an aspect in which a photoluminescent image is formed on one surface of the recording paper P by operating only the first unit 10G, the recording paper P is sent upstream in the traveling direction of the intermediate transfer belt, a photoluminescent image is superimposed on the photoluminescent image of the recording paper P by operating only the first unit 10G again, the recording paper P is returned upstream in the traveling direction of the intermediate transfer belt, and a color image is formed on multilayers of the photoluminescent images of the recording paper P by operating the second unit 10Y to the fifth unit 10K.

Process Cartridge and Toner Cartridge

The process cartridge according to the present exemplary embodiment will be described.

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachably attached to the image forming device.

The configuration of the process cartridge according to the present exemplary embodiment is not limited thereto, and a configuration including a developing unit and, as necessary, at least one selected from other units, such as an image holding member, a charging unit, an electrostatic charge image forming unit, or a transfer unit may be employed.

Hereinafter, an example of the process cartridge according to the present exemplary embodiment will be described, but the present invention is not limited thereto. In the description below, main parts shown in the figures will be described, but description of other parts will not be provided.

Figure 2:
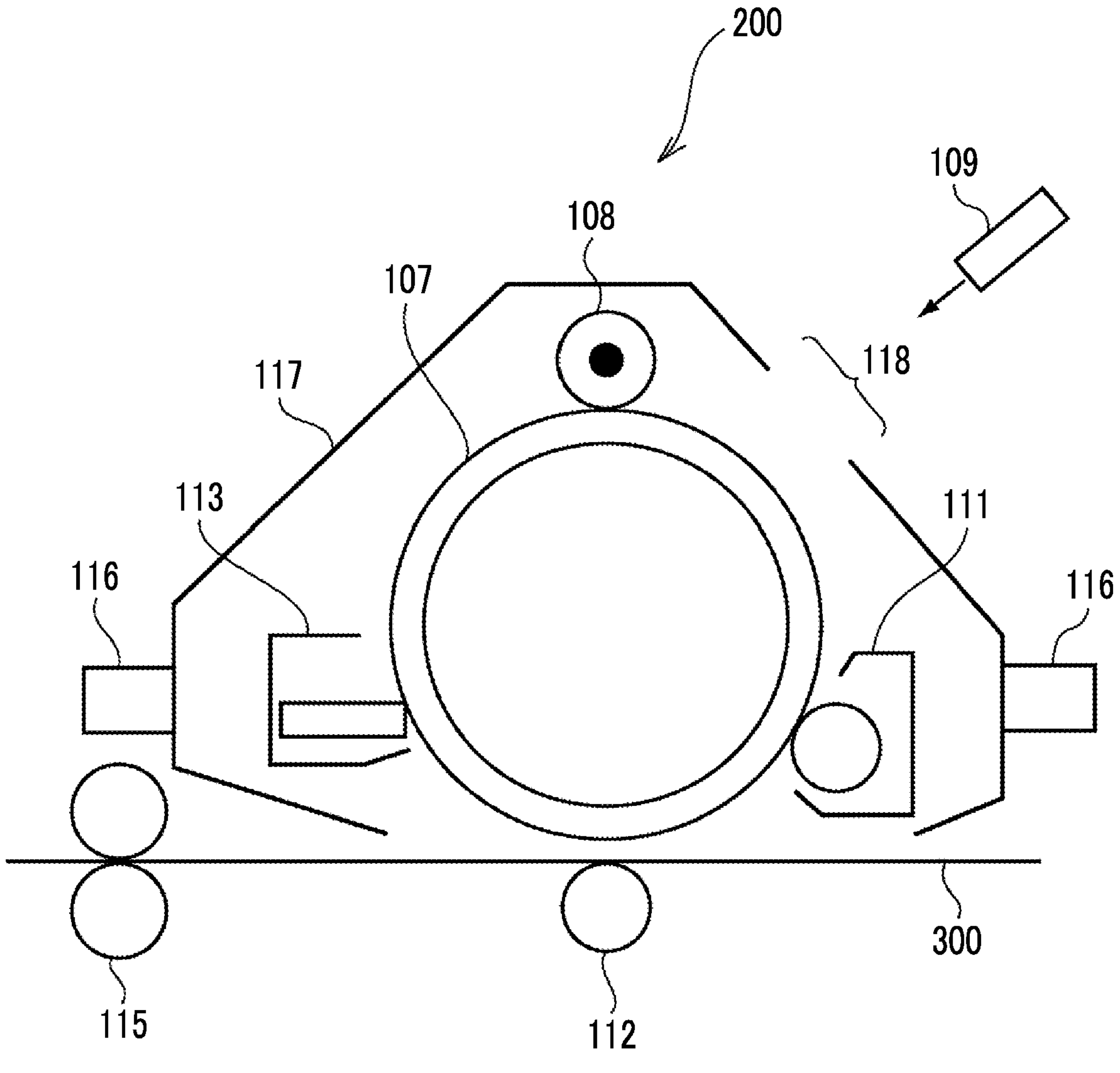
FIG. 2 is a schematic configuration view showing an example of a process cartridge detachably attached to the image forming device according to the present exemplary embodiment.

FIG. 2 is a schematic configuration view showing the process cartridge according to the present exemplary embodiment.

A process cartridge 200 shown in FIG. 2 is, for example, configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

The toner cartridge according to the present exemplary embodiment will be described below.

The toner cartridge according to the present exemplary embodiment is a toner cartridge that includes a container accommodating the photoluminescent toner according to the present exemplary embodiment and is detachable from the image forming device. The toner cartridge includes a container accommodating a toner for replenishment which is to be supplied to the developing unit provided in the image forming device.

The image forming device shown in FIG. 1 is an image forming device having a configuration in which the toner cartridges 8G, 8Y, 8M, 8C, and 8K are detachable, and the developing devices 4G, 4Y, 4M, 4C, and 4K are respectively connected to the toner cartridge corresponding to each color through a toner supply tube (not shown). Further, in a case where the amount of toner accommodated in the container of the toner cartridge is decreased, the toner cartridge is replaced. An example of the toner cartridge according to the present exemplary embodiment is the toner cartridge 8G, which accommodates the photoluminescent toner according to the present exemplary embodiment. The toner cartridges 8Y, 8M, 8C, and 8K respectively accommodate each of yellow, magenta, cyan, and black toners.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

Unless otherwise specified, synthesis, treatments, production and the like are performed at room temperature (25° C.±3° C.)

Preparation of Resin Particle Dispersion Liquid

Amorphous polyester resin particle dispersion liquid (A)

Terephthalic acid: 70 parts

Fumaric acid: 30 parts

Ethylene glycol: 41 parts 1,5-pentanediol: 48 parts

The above-described materials are added to a reaction vessel equipped with a stirrer, a nitrogen introduction tube, a temperature sensor, and a rectifying tower, the temperature is increased to 220° C. for 1 hour in a nitrogen gas stream, and 1 part of titanium tetraethoxide is added to a total of 100 parts of the materials. The temperature is increased to 240° C. for 0.5 hours while water to be generated is distilled off, the dehydration condensation reaction is continued at a temperature of 240° for 1 hour, and the reaction product is cooled. In this manner, an amorphous polyester resin (A) having a weight-average-molecular weight of 96000 and a glass transition temperature of 61° C. is obtained.

40 parts of ethyl acetate and 25 parts of 2-butanol are added to a vessel equipped with a temperature control unit and a nitrogen substitution unit to prepare a mixed solvent, 100 parts of the amorphous polyester resin (A) is gradually added to the solvent to be dissolved therein, and a 10% ammonia aqueous solution (amount equivalent to 3 times the acid value of the resin in terms of the molar ratio) is added thereto, and the solution is stirred for 30 minutes. Next, the inside of the reaction container is substituted with dry nitrogen, the temperature is maintained at 40° C., 400 parts of ion exchange water is added dropwise thereto at a rate of 2 parts/minute while the mixed solution is stirred, and emulsification is performed. After completion of the dropwise addition, the temperature of the emulsified liquid is returned to 25° C., the solvent is removed under reduced pressure, thereby obtaining a resin particle dispersion liquid in which resin particles having a volume average particle diameter of 160 nm are dispersed. The solid content is adjusted to 20% by adding ion exchange water to the resin particle dispersion liquid, thereby obtaining an amorphous polyester resin particle dispersion liquid (A).

Crystalline Polyester Resin Particle Dispersion Liquid (C)

1,10-Decanedicarboxylic acid: 265 parts 1,6-Hexanediol: 168 parts

Dibutyl tin oxide (catalyst): 0.3 parts

The above-described materials are added to a heated and dried reaction vessel, the air in the reaction vessel is substituted with nitrogen gas to prepare an inert atmosphere, and the mixture is stirred and refluxed at 180° C. for 5 hours by mechanical stirring. Thereafter, the mixture is gradually heated to 230° C. under reduced pressure, stirred for 2 hours, and air-cooled when the mixture enters a viscous state to stop the reaction. In this manner, a crystalline polyester resin (C) having a weight-average-molecular weight of 12700 and a melting temperature of 73° C. is obtained.

90 parts of the crystalline polyester resin (C), 1.8 parts of an anionic surfactant (NEOGEN RK, manufactured by DKS Co., Ltd.), and 210 parts of ion exchange water are mixed, heated to 120° C. to be dispersed using a homogenizer (ULTRA-TURRAX T50, manufactured by IKA), and subjected to a dispersion treatment using a pressure discharge type Gaulin homogenizer for 1 hour, thereby obtaining a resin particle dispersion liquid in which resin particles having a volume average particle diameter of 160 nm are dispersed. The solid content is adjusted to 20% by adding ion exchange water to the resin particle dispersion liquid, thereby obtaining a crystalline polyester resin particle dispersion liquid (C).

Preparation of Release Agent Particle Dispersion Liquid

Release Agent Particle Dispersion Liquid (W1)

Ester wax (melting temperature of 83° C., NISSAN ELECTOL WEP-5, manufactured by NOF Corporation): 180 parts Anionic surfactant (NEOGEN RK, manufactured by DKS Co., Ltd.): 4.5 parts Ion exchange water: 410 parts The above-described materials are heated to 110° C., subjected to a dispersion treatment with a homogenizer (ULTRA-TURRAX T50, manufactured by IKA), and further subjected to a dispersion treatment with a Manton Gaulin high-pressure homogenizer (manufactured by Gaulin). The temperature is lowered to room temperature, and ion exchange water is added to the mixture to adjust the solid content thereto to 30%, thereby obtaining a release agent particle dispersion liquid (W1). The volume average particle diameter of the particles dispersed in the release agent particle dispersion liquid (W1) is 252 nm.

Release Agent Particle Dispersion Liquid (W2)

A release agent particle dispersion liquid (W2) is prepared in the same manner as in the preparation of the release agent particle dispersion liquid (W1) except that the release agent is changed to Fischer-Tropsch wax (FNP0090, manufactured by Nippon Seiro Co., Ltd., melting temperature of 94° C.). The volume average particle diameter of the particles dispersed in the release agent particle dispersion liquid (W2) is 240 nm.

Release Agent Particle Dispersion Liquid (W3)

A release agent particle dispersion liquid (W3) is prepared in the same manner as in the preparation of the release agent particle dispersion liquid (W1) except that the pressure condition is changed. The volume average particle diameter of the particles dispersed in the release agent particle dispersion liquid (W3) is 320 nm.

Release Agent Particle Dispersion Liquid (W4)

A release agent particle dispersion liquid (W4) is prepared in the same manner as in the preparation of the release agent particle dispersion liquid (W1) except that the pressure condition is changed. The volume average particle diameter of the particles dispersed in the release agent particle dispersion liquid (W4) is 212 nm.

Release Agent Particle Dispersion Liquid (W5)

A release agent particle dispersion liquid (W5) is prepared in the same manner as in the preparation of the release agent particle dispersion liquid (W1) except that the release agent is changed to paraffin wax (HNP9, manufactured by Nippon Seiro Co., Ltd., melting temperature of 75° C.). The volume average particle diameter of the particles dispersed in the release agent particle dispersion liquid (W5) is 241 nm.

Release Agent Particle Dispersion Liquid (W6)

A release agent particle dispersion liquid (W6) is prepared in the same manner as in the preparation of the release agent particle dispersion liquid (W1) except that the release agent is changed to polyethylene wax (PW725, manufactured by NuCera Solutions, melting temperature of 104° C.). The volume average particle diameter of the particles dispersed in the release agent particle dispersion liquid (W6) is 230 nm.

Preparation of Photoluminescent Pigment Dispersion Liquid

Photoluminescent Pigment Dispersion Liquid (G1)

Aluminum atomized powder (average particle diameter of 4 μm): 100 parts

Mineral spirit: 120 parts

Stearic acid: 3 parts

The above-described materials are mixed and ground in a ball mill for 15 hours. Thereafter, 500 parts of ethyl acetate is mixed with the mixture and subjected to solid-liquid separation. The operation of mixing 500 parts of ethyl acetate with the solid content repeatedly performed, thereby obtaining a flat aluminum pigment (1).

Aluminum pigment (1): 100 parts

Anionic surfactant (NEOGEN RK, manufactured by DKS Co., Ltd.): 1.5 parts

Ion exchange water: 900 parts

The above-described materials are mixed and dispersed for 1 hour using an emulsifying disperser CAVITRON, thereby obtaining a photoluminescent pigment dispersion liquid (G1) having a solid content of 10%.

Photoluminescent Pigment Dispersion Liquid (G2)

A photoluminescent pigment dispersion liquid (G2) is obtained in the same manner as that for the photoluminescent pigment dispersion liquid (G1) except that the average particle diameter of the aluminum atomized powder is changed to 2 μm.

Photoluminescent Pigment Dispersion Liquid (G3)

A photoluminescent pigment dispersion liquid (G3) is obtained in the same manner as that for the photoluminescent pigment dispersion liquid (G1) except that the average particle diameter of the aluminum atomized powder is changed to 2.5 μm and the grinding time in ball mill is changed to 8 hours.

Preparation of Silicone Oil-Treated Silica Particles

Silicone Oil-Treated Silica Particles (1)

$SiCl_4$, hydrogen gas, and oxygen gas are mixed in a mixing chamber of a combustion burner, and the mixture is fired at a temperature of 1000° C. to 3000° C. A silica substrate is obtained by taking out the silica powder from the gas after firing. At this time, the molar ratio of hydrogen gas to oxygen gas is set to 1.02:1, thereby obtaining silica particles (1) having a number average particle diameter of 85 nm.

100 parts of the silica particles (1) and 500 parts of ethanol are added to an evaporator and stirred for 15 minutes while being maintained at a temperature of 40° C. Next, 10 parts of dimethylsilicone oil is added to the mixture and stirred for 15 minutes, and 10 parts of dimethylsilicone oil is further added thereto and stirred for 15 minutes. Next, the temperature is raised to 90° C., and ethanol is dried under reduced pressure and further vacuum-dried at 120° C. for 30 minutes. In this manner, silicone oil-treated silica particles (1) are obtained.

Silicone Oil-Treated Silica Particles (2)

Silica particles (2) having a number average particle diameter of 40 nm are obtained in the same manner as that for the silica particles (1) except that the molar ratio between hydrogen gas and oxygen gas is changed to 0.74:1.

Silicone oil-treated silica particles (2) are obtained using the silica particles (2) by performing the same treatment as the treatment for the silicone oil-treated silica particles (1).

Silicone Oil-Treated Silica Particles (3)

Silica particles (3) having a number average particle diameter of 135 nm are obtained in the same manner as that for the silica particles (1) except that the molar ratio between hydrogen gas and oxygen gas is changed to 1.35:1.

Silicone oil-treated silica particles (3) are obtained using the silica particles (3) in the same manner as that for the silicone oil-treated silica particles (1) except that the addition amount of dimethyl silicone oil is changed to 4 parts.

Preparation of Toner and Developer

Example 1

Preparation of the First Aggregated Particles

Amorphous polyester resin particle dispersion liquid (A) (solid content of 20%): 170 parts Crystalline polyester resin particle dispersion liquid (C) (solid content of 20%): 12 parts Photoluminescent pigment dispersion liquid (G1) (solid content of 10%): 200 parts Release agent particle dispersion liquid (W1) (solid content of 30%): 5 parts Anionic surfactant (NEOGEN RK, manufactured by DKS Co., Ltd.): 1.5 parts The above-described materials are added to in a stirring vessel, and 0.1 N nitric acid is added thereto to adjust the pH to 3.5. An aluminum sulfate aqueous solution obtained by dissolving 2.5 parts of aluminum sulfate in 30 parts of ion exchange water is prepared and added to the stirring vessel. The mixture is dispersed using a homogenizer (ULTRA-TURRAX T50, manufactured by IKA) at 30° C., heated to 45° C. in a heating oil bath, and maintained until the volume average particle diameter of the aggregated particles reach 9.0 μm.

Preparation of Second Aggregated Particles 133 parts of the amorphous polyester resin particle dispersion liquid (A) (solid content of 20%) and 15 parts of the release agent particle dispersion liquid (W1) (solid content of 30%) are added to a stirring vessel and maintained for 60 minutes, thereby obtaining a dispersion liquid containing the second aggregated particles.

20 parts of a 10 mass % NTA (nitrilotriacetic acid) metal salt aqueous solution (CHELEST 70, manufactured by Chelest Corporation) is added to the dispersion liquid containing the second aggregated particles.

Fusion and Coalescence Step

While the solution in the stirring vessel is continuously stirred, a 1 N sodium hydroxide aqueous solution is added to adjust the pH to 9.5. Next, the solution is heated to 90° C. at a temperature rising rate of 0.5° C./min and maintained for 3.5 hours. Next, the solution is cooled to 30° C. at a temperature lowering rate of 0.5° C./min. Next, the solid content is separated by filtration, sufficiently cleaned with ion exchange water, and dried, thereby obtaining photoluminescent toner particles having a volume average particle diameter of 11.2 μm.

External Addition of Hydrophobic Silica Particles 1.8 parts of the silicone oil-treated silica particles (1) are added to 100 parts of the photoluminescent toner particles and mixed at 13000 rpm for 30 seconds using a sample mill. Thereafter, the mixture is sieved with a vibrating sieve having a mesh opening of 45 μm, thereby preparing an external toner.

Mixing with Carrier 100 parts of a carrier and 5 parts of the external toner are added to a V-blender and stirred for 20 minutes. Thereafter, the mixture is sieved with a sieve having a mesh opening of 212 μm, thereby obtaining a developer. The carrier is prepared as follows.

Preparation of Carrier

Ferrite particles (volume average particle diameter of 50 μm): 100 parts

Toluene: 14 parts

Styrene/methyl methacrylate copolymer (copolymerization ratio of 15/85): 3 parts Carbon black: 0.2 parts A dispersion liquid obtained by dispersing the above-described materials excluding ferrite particles in a sand mill is prepared, the dispersion liquid and the ferrite particles are added to a vacuum degassing type kneader and dried under reduced pressure while being stirred, thereby obtaining a resin-coated carrier.

Examples 2 to 15 and Comparative Examples 1 and 2

Photoluminescent toner particles, an external toner, and a developer of each example are prepared in the same manner as in Example 1 except that the formulation of the release agent particle dispersion liquid, the fusion and coalescence step, the kind and the addition amount of the silicone oil-treated silica particles are changed as listed in Table 1.

Performance Evaluation

Formation of Photoluminescent Image

Photoluminescent images are continuously printed on 5000 sheets of A4 size coated paper (OK TOP COAT+paper, Oji Paper Co., Ltd.) in an environment of a temperature of 10° C. and a relative humidity of 10% using an electrophotographic image forming device (Color 1000 Press, Fuji Xerox Co., Ltd.). The photoluminescent image is an image in which a plurality of strip-shaped images having a density of 100% intersect each other vertically and horizontally. Subsequently, one full-scale photoluminescent image having a density of 50% is output.

Evaluation of Gloss Unevenness

The 5000th strip-shaped photoluminescent image with a density of 100% is used as a measurement sample. The gloss is measured at an incident light angle of 75 degrees with respect to the image using a gloss meter GM-26D (Murakami Color Technology Laboratory). The measurement sites are nine sites formed such that three strips that are parallel to the A4 paper in the short direction and are positioned at distances of 3 cm, 8 cm, and 15 cm from one end the A4 paper in the longitudinal direction and three strips that are parallel to the A4 paper in the longitudinal direction and are positioned at distances of 3 cm, 6 cm, and 10 cm from one end the A4 paper in the short direction intersect each other. A difference in gloss between the maximum value and the minimum value at 9 sites is classified into A to D as follows. The results are listed in Table 2.

A: The difference in gloss between the maximum value and the minimum value is less than 2.0

B: The difference in gloss between the maximum value and the minimum value is 2.0 or greater and less than 4.0

C: The difference in gloss between the maximum value and the minimum value is 4.0 or greater and less than 10.0

D: The difference in gloss between the maximum value and the minimum value is 10.0 or greater Evaluation of Image Streaks Full-scale photoluminescent images having a density of 50% are visually observed and classified into A to D as follows. The results are listed in Table 2.

A: No streaky image defects are observed.

B: Extremely minor streaky image defects are observed.

C: Minor streaky image defects are observed, which is acceptable.

D: Streaky image defects are scattered all over the surface, which is not acceptable.

TABLE 1

| | Release agent particle dispersion liquid | | | | | | Fusion and coalescence step | | | |
|---|---|---|---|---|---|---|---|---|---|---|
| | Type — | Type of release agent — | Melting point of release agent ° C. | Volume average particle diameter of dispersed particles nm | Used amount for preparation of first aggregated particles parts by mass | Used amount for preparation of second aggregated particles parts by mass | pH — | Temperature rising rate ° C./min | Reaching temperature ° C. | Holding time Time |
| Comparative Example 1 | (W1) | Ester wax | 83 | 252 | 23 | 0 | 9.5 | 0.3 | 90 | 5.0 |
| Comparative Example 2 | (W1) | Ester wax | 83 | 252 | 17 | 0 | 8.0 | 1.0 | 90 | 3.0 |
| Example 1 | (W1) | Ester wax | 83 | 252 | 5 | 15 | 9.5 | 0.5 | 90 | 3.5 |
| Example 2 | (W2) | Fischer-Tropsch wax | 94 | 240 | 5 | 15 | 9.5 | 0.5 | 90 | 3.5 |
| Example 3 | (W3) | Ester wax | 83 | 320 | 5 | 15 | 9.5 | 0.2 | 90 | 5.0 |
| Example 4 | (W4 ) | Ester wax | 83 | 212 | 5 | 15 | 9.5 | 0.5 | 90 | 2.5 |
| Example 5 | (W3) | Ester wax | 83 | 320 | 7 | 23 | 9.5 | 0.3 | 90 | 4.5 |
| Example 6 | (W1) | Ester wax | 83 | 252 | 7 | 23 | 9.5 | 0.5 | 90 | 3.5 |
| Example 7 | (W1) | Ester wax | 83 | 252 | 5 | 15 | 9.5 | 0.5 | 90 | 3.5 |
| Example 8 | (W1) | Ester wax | 83 | 252 | 5 | 15 | 9.5 | 0.2 | 90 | 4.5 |
| Example 9 | (W1) | Ester wax | 83 | 252 | 5 | 15 | 9.5 | 0.5 | 90 | 3.5 |
| Example 10 | (W1) | Ester wax | 83 | 252 | 5 | 15 | 9.5 | 0.5 | 90 | 3.5 |

TABLE 1-continued

| | Release agent particle dispersion liquid | | | | | | Fusion and coalescence step | | | |
|---|---|---|---|---|---|---|---|---|---|---|
| | Type — | Type of release agent — | Melting point of release agent ° C. | Volume average particle diameter of dispersed particles nm | Used amount for preparation of first aggregated particles parts by mass | Used amount for preparation of second aggregated particles parts by mass | pH — | Temperature rising rate ° C./min | Reachinq temperature ° C. | Holding time Time |
| Example 11 | (W1) | Ester wax | 83 | 252 | 5 | 15 | 9.5 | 0.5 | 90 | 3.5 |
| Example 12 | (W1) | Ester wax | 83 | 252 | 5 | 15 | 9.5 | 0.5 | 90 | 3.5 |
| Example 13 | (W1) | Ester wax | 83 | 252 | 5 | 15 | 9.5 | 0.5 | 90 | 3.5 |
| Example 14 | (W5) | Paraffin wax | 75 | 241 | 5 | 15 | 9.5 | 0.5 | 90 | 3.5 |
| Example 15 | (W6) | Polyethylene wax | 104 | 230 | 5 | 15 | 9.5 | 0.5 | 90 | 3.5 |

TABLE 2

| | Release agent domain | | | | | Silicone oil-treated silica particles | | | | | | |
|---|---|---|---|---|---|---|---|---|---|---|---|---|
| | Release agent contained in surface layer portion % (area ratio) | Dw µm | Average aspect ratio — | Photo-luminescent pigment Dp µm | Dw/Dp — | Type — | Average primary particles nm | External addition amount/100 parts of toner particles parts by mass | Mass ratio of free oil to release agent Free oil/release agent — | Temperature of endothermic peak observed at 80° C. to 100° C. in DSC ° C. | Gloss unevenness — | Image streak — |
| Comparative Example 1 | 55 | 2.5 | 1.05 | 2.4 | 1.05 | (1) | 85 | 1.8 | 1.23 | 82 | D | D |
| Comparative Example 2 | 65 | 0.6 | 1.03 | 3.2 | 0.20 | (1) | 85 | 1.8 | 1.73 | 84 | D | D |
| Example 1 | 75 | 1.3 | 1.03 | 3.2 | 0.42 | (1) | 85 | 1.8 | 1.44 | 83 | A | A |
| Example 2 | 75 | 1.2 | 1.04 | 3.2 | 0.38 | (1) | 85 | 1.8 | 1.44 | 95 | A | A |
| Example 3 | 51 | 3.1 | 1.14 | 3.2 | 0.98 | (1) | 85 | 1.8 | 1.44 | 82 | C | C |
| Example 4 | 90 | 1.9 | 1.03 | 6.2 | 0.31 | (1) | 85 | 1.8 | 1.44 | 83 | B | C |
| Example 5 | 52 | 2.5 | 1.09 | 3.2 | 0.79 | (1) | 85 | 1.8 | 1.44 | 82 | A | B |
| Example 6 | 65 | 2.0 | 1.41 | 6.2 | 0.32 | (1) | 85 | 1.8 | 1.44 | 83 | C | C |
| Example 7 | 72 | 1.9 | 1.26 | 6.2 | 0.31 | (1) | 85 | 1.8 | 1.44 | 83 | B | B |
| Example 8 | 51 | 2.2 | 1.12 | 6.2 | 0.35 | (1) | 85 | 1.8 | 1.44 | 83 | B | C |
| Example 9 | 75 | 1.9 | 1.16 | 6.2 | 0.30 | (1) | 85 | 1.8 | 1.44 | 83 | B | B |
| Example 10 | 75 | 1.3 | 1.03 | 3.2 | 0.42 | (2) | 40 | 1.2 | 0.90 | 83 | B | B |
| Example 11 | 75 | 1.3 | 1.03 | 3.2 | 0.42 | (3) | 135 | 2.0 | 1.50 | 83 | A | B |
| Example 12 | 75 | 1.3 | 1.03 | 3.2 | 0.42 | (1) | 85 | 0.2 | 0.03 | 83 | C | C |
| Example 13 | 75 | 1.3 | 1.03 | 3.2 | 0.42 | (1) | 85 | 1.8 | 1.44 | 83 | B | B |
| Example 14 | 78 | 1.3 | 1.03 | 3.2 | 0.41 | (1) | 85 | 1.8 | 1.44 | 76 | A | A |
| Example 15 | 78 | 1.4 | 1.04 | 3.2 | 0.43 | (1) | 85 | 1.8 | 1.44 | 102 | B | B |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A photoluminescent toner comprising:

a photoluminescent toner particle that contains a binder resin, a release agent, and a photoluminescent pigment and has a release agent domain; and a silicone oil-treated silica particle that is externally added to the photoluminescent toner particle, wherein in observation of a cross section of the photoluminescent toner particle, an average major axis length Dw of the release agent domain and an average major axis length Dp of the photoluminescent pigment satisfy Expression (1), $$0.3 \le Dw/Dp \le 1.0. \quad \text{Expression (1):}$$

2. The photoluminescent toner according to claim 1, wherein in observation of the cross section of the photoluminescent toner particle, the average major axis length Dw of the release agent domain and the average major axis length Dp of the photoluminescent pigment satisfy Expression (1-1), $$0.3 \le Dw/Dp \le 0.8. \quad \text{Expression (1-1):}$$

3. The photoluminescent toner according to claim 1, wherein in observation of the cross section of the photoluminescent toner particle, an average aspect ratio of the release agent domain (average of major axis length/minor axis length) is 1.00 or greater and 1.40 or less.

4. The photoluminescent toner according to claim 1, wherein in observation of the cross section of the photoluminescent toner particle, an average aspect ratio of the release agent domain (average of major axis length/minor axis length) is 1.00 or greater and 1.25 or less.

5. The photoluminescent toner according to claim 1, wherein in observation of the cross section of the photoluminescent toner particle, an area of the release agent domain contained in a surface layer portion to a depth of 1 μm from a surface of the photoluminescent toner particle is 50% or greater and 100% or less with respect to an entire area of the release agent domain contained in the photoluminescent toner particle.

6. The photoluminescent toner according to claim 1, wherein in observation of the cross section of the photoluminescent toner particle, an area of the release agent domain contained in a surface layer portion to a depth of 1 μm from a surface of the photoluminescent toner particle is 70% or greater and 100% or less with respect to an entire area of the release agent domain contained in the photoluminescent toner particle.

7. The photoluminescent toner according to claim 1, wherein the silicone oil-treated silica particle has an average primary particle diameter of 40 nm or greater and 140 nm or less.

8. The photoluminescent toner according to claim 1, wherein a mass ratio (free oil/release agent) of an amount of free oil present in the photoluminescent toner to an amount of the release agent contained in the photoluminescent toner particle is 0.03 or greater and 2.00 or less.

9. The photoluminescent toner according to claim 1, wherein in observation of the cross section of the photoluminescent toner particle, the average major axis length Dw of the release agent domain is 0.3 μm or greater and 2.0 μm or less.

10. The photoluminescent toner according to claim 1, wherein at least one endothermic peak is observed in a temperature range of 80° C. or higher and 100° C. or lower during differential scanning calorimetry.

11. The photoluminescent toner according to claim 1, wherein the release agent includes an ester wax.

12. An electrostatic charge image developer comprising:

the photoluminescent toner according to claim 1.

13. A toner cartridge comprising:

a container that accommodates the photoluminescent toner according to claim 1, wherein the toner cartridge is detachable from an image forming device.

* * * * *